United States Patent
Fujinami et al.

(10) Patent No.: US 6,192,189 B1
(45) Date of Patent: *Feb. 20, 2001

(54) DATA RECORDING METHOD AND APPARATUS, DATA RECORDED MEDIUM AND DATA REPRODUCING METHOD AND APPARATUS

(75) Inventors: Yasushi Fujinami; Makoto Kawamura, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/132,159

(22) Filed: Aug. 10, 1998

Related U.S. Application Data

(63) Continuation of application No. 08/690,873, filed on Aug. 1, 1996, now Pat. No. 5,881,203.

(30) Foreign Application Priority Data

Aug. 2, 1995 (JP) .................................................. 7-197816
May 28, 1996 (JP) .................................................. 8-133664

(51) Int. Cl.$^7$ ..................................................... H04N 5/928
(52) U.S. Cl. .............................. 386/96; 386/125; 386/99; 386/46; 386/126
(58) Field of Search .................................. 386/95, 96, 97, 386/98, 99, 39, 126, 101–107, 125, 46, 94; 360/60, 49; 330/203, 212; 369/58, 32, 275, 3; H04N 5/928

(56) References Cited

U.S. PATENT DOCUMENTS

| | | | | |
|---|---|---|---|---|
| 4,794,465 | * | 12/1988 | Van Luyt et al. | 358/341 |
| 5,400,077 | * | 3/1995 | Cookson et al. | 348/556 |
| 5,598,276 | * | 1/1997 | Cookson et al. | 386/46 |
| 5,617,386 | * | 4/1997 | Choi | 369/32 |
| 5,691,972 | * | 11/1997 | Tsuga et al. | 369/275.3 |
| 5,881,203 | * | 3/1999 | Fujinami et al. | 386/96 |

* cited by examiner

Primary Examiner—Wendy Garber
Assistant Examiner—Vincent F. Boccio
(74) Attorney, Agent, or Firm—Frommer Lawrence & Haug, LLP.; William S. Frommer; Dennis M. Smid

(57) ABSTRACT

A data recording method is provided in which video data and plural channels of language data are divided into packets as units, and the video data and the plural channels of language data are recorded on a record medium along with the control information containing a flag designating a reproducing channel of the language data matched to a reproducing pattern of the video data. Thus it becomes possible to record video data and plural channels of language data on a record medium so that a reproducing channel for the language data matched to the reproducing pattern of the video data will be selected and the plural channels of language data matched to the reproducing pattern and the video data will be reproduced by a reproducing system.

10 Claims, 14 Drawing Sheets

| Syntax | No. of bits | Mnemonic |
|---|---|---|
| directory_PES_packet() { | | |
|     packet_start_code_prefix | 24 | bslbf |
|     directory_stream_id | 8 | uimsbf |
|     PES_packet_length | 16 | uimsbf |
|     number_of_access_units | 15 | uimsbf |
|     marker_bit | 1 | bslbf |
|     prev_directory_offset[44..30] | 15 | uimsbf |
|     marker_bit | 1 | bslbf |
|     prev_directory_offset[29..15] | 15 | uimsbf |
|     marker_bit | 1 | bslbf |
|     prev_directory_offset[14..0] | 15 | uimsbf |
|     marker_bit | 1 | bslbf |
|     prev_directory_offset[44..30] | 15 | uimsbf |
|     marker_bit | 1 | bslbf |
|     prev_directory_offset[29..15] | 15 | uimsbf |
|     marker_bit | 1 | bslbf |
|     prev_directory_offset[14..0] | 15 | uimsbf |
|     marker_bit | 1 | bslbf |
|     for(i=0; i<number_of_access_units;i++) { | | |
|         packet_stream_id | 8 | uimsbf |
|         PES_header_position_offset_sign | 1 | tcimsbf |
|         PES_header_position_offset[43..30] | 14 | uimsbf |
|         marker_bit | 1 | bslbf |
|         PES_header_position_offset[29..15] | 15 | uimsbf |
|         marker_bit | 1 | bslbf |
|         PES_header_position_offset[14..0] | 15 | uimsbf |
|         marker_bit | 1 | bslbf |
|         reference_offset | 16 | uimsbf |
|         marker_bit | 1 | bslbf |
|         reserved | 3 | bslbf |
|         PTS[32..30] | 3 | uimsbf |
|         marker_bit | 1 | bslbf |
|         PTS[29..15] | 15 | uimsbf |
|         marker_bit | 1 | bslbf |
|         PTS[14..0] | 15 | uimsbf |
|         marker_bit | 1 | bslbf |
|         bytes_to_read[22..8] | 15 | uimsbf |
|         marker_bit | 1 | bslbf |
|         bytes_to_read[7..0] | 8 | uimsbf |
|         marker_bit | 1 | bslbf |
|         intra_coded_indicator | 1 | bslbf |
|         coding_parameters_indicator | 2 | bslbf |
|         reserved | 4 | bslbf |
|     } | | |
| } | | |

FIG.4

| Syntax | No. of Bits | Mnemonic |
|---|---|---|
| program_stream_map(){ | | |
|     packet_start_code_prefix | 24 | bslbf |
|     map_stream_id | 8 | uimsbf |
|     program_stream_map_length | 16 | uimsbf |
|     current_next_indicator | 1 | bslbf |
|     reserved | 2 | bslbf |
|     program_stream_map_version | 5 | uimsbf |
|     reserved | 7 | bslbf |
|     marker_bit | 1 | bslbf |
|     program_stream_info_length | 16 | uimsbf |
|     for (i=0;i<N;i++){ | | |
|         descriptor() | | |
|     } | | |
|     elementary_streem_info_length | 16 | uimsbf |
|     for (i=0;i<N1;i++){ | | |
|         stream_type | 8 | uimsbf |
|         elementary_stream_id | 8 | uimsbf |
|         elementary_stream_info_length | 16 | uimsbf |
|         for (i=0;i<N2;i++){ | | |
|             descriptor() | | |
|         } | | |
|     } | | |
|     CRC_32 | 32 | rpchof |
| } | | |

B { program_stream_info_length ... elementary_streem_info_length loop }
C { elementary stream loop ... CRC_32 }

FIG.5

| Descriptor | Type | Tag |
|---|---|---|
| path_descriptor() | DVD defined | 0xf0 |
| program_descriptor () | DVD defined | 0xef |
| stream_grouping_descriptor () | DVD defined | 0xed |
| copy_control_descriptor () | DVD defined | 0xec |
| padding_descriptor () | DVD defined | 0xeb |
| layer_jump_descriptor () | Not yet defined | 0xea |
| dvd_private_stream_descriptor () | DVD defined | 0xe9 |
| dvd_video_descriptor () | DVD defined | 0xdf |
| dvd_audio_descriptor () | DVD defined | 0xdd |
| dvd_subtitle_descriptor () | DVD defined | 0xdc |
| dvd_lpcm_descriptor () | DVD defined | 0xdb |
| ISO_639_Language_descriptor () | DVD defined | 0x0a |
| ip_ipp_descriptpr () | DVD defined | 0xda |
| copyright_descriptor () | MPEG defined | 0x0d |
| video_special_coding_descriptor () | Not yet defined | 0xeb |

FIG.6

| Syntax | No. of Bits | Mnemonic |
|---|---|---|
| dvd_audio_descriptor() | | |
| { | | |
|     descriptor_tag | 8 | uimsbf |
|     descriptor_length | 8 | uimsbf |
|     free_format_flag | 1 | bslbf |
|     ID | 1 | bslbf |
|     layer | 2 | bslbf |
|     variable_rate_audio_indicator | 1 | bslbf |
|     channel_configuration | 3 | uimsbf |
|     low_frequency_enhancement | 1 | bslbf |
|     num_language_channels | 3 | uimsbf |
|     reserved | 2 | bslbf |
|     matrixing | 2 | bslbf |
|     for(i=0;i<num_language_channels;i++){ | | |
|         path_number_flag_0 | 1 | bslbf |
|         path_number_flag_1 | 1 | bslbf |
|         path_number_flag_2 | 1 | bslbf |
|         path_number_flag_3 | 1 | bslbf |
|         path_number_flag_4 | 1 | bslbf |
|         path_number_flag_5 | 1 | bslbf |
|         path_number_flag_6 | 1 | bslbf |
|         path_number_flag_7 | 1 | bslbf |
|     } | | |
|     padding | 0-8 | bslbf |
| } | | |

FIG.7

| Syntax | No. of Bits | Mnemonic |
|---|---|---|
| dvd_lpcm_descriptor() | | |
| { | | |
|     descriptor_tag | 8 | uimsbf |
|     descriptor_length | 8 | uimsbf |
|     reserved | 4 | bslbf |
|     mix_type | 4 | bslbf |
|     path_number_flag_0 | 1 | bslbf |
|     path_number_flag_1 | 1 | bslbf |
|     path_number_flag_2 | 1 | bslbf |
|     path_number_flag_3 | 1 | bslbf |
|     path_number_flag_4 | 1 | bslbf |
|     path_number_flag_5 | 1 | bslbf |
|     path_number_flag_6 | 1 | bslbf |
|     path_number_flag_7 | 1 | bslbf |
|     } | | |
|     padding | 0-8 | bslbf |
| } | | |

FIG.8

| Syntax | No. of Bits | Mnemonic |
|---|---|---|
| dvd_subtitle_descriptor() | | |
| { | | |
|     descriptor_tag | 8 | uimsbf |
|     descriptor_length | 8 | uimsbf |
|     subtitle_type | 4 | bslbf |
|     aspect_ratio_information | 4 | uimsbf |
|     path_number_flag_0 | 1 | bslbf |
|     path_number_flag_1 | 1 | bslbf |
|     path_number_flag_2 | 1 | bslbf |
|     path_number_flag_3 | 1 | bslbf |
|     path_number_flag_4 | 1 | bslbf |
|     path_number_flag_5 | 1 | bslbf |
|     path_number_flag_6 | 1 | bslbf |
|     path_number_flag_7 | 1 | bslbf |
|     } | | |
|     padding | 0-8 | bslbf |
| } | | |

FIG.9

| Value | Description |
|---|---|
| 0000 | Normal subtitle |
| 0001 | No lauñage |
| 0010 | Heanng impaired |
| 0011 | Visually impaired |
| 0100 - 1111 | Reserved |

FIG.10

| Syntax | No. of Bits | Mnemonic |
|---|---|---|
| TOC(){ | | |
|     Number_of_streams | 16 | bslbf |
|     for(i=0;i<number_of_streams;i++){ | | |
|         start_sector_address | 32 | uimsbf |
|         end_sector-address | 32 | uimsbf |
|         program_stream_map() | | |
|     } | | |
| } | | |

FIG.13

| Syntax | No. of bits | Mnemonic |
|---|---|---|
| path_descriptor() | | |
| { | | |
|     descriptor_tag | 8 | uimsbf |
|     descriptor_length | 8 | uimsbf |
|     reserved | 5 | bslbf |
|     path_number | 3 | uimsbf |
|     reserved | 4 | bslbf |
|     PTS[32..30] | 3 | bslbf |
|     marker | 1 | bslbf |
|     PTS[29..15] | 15 | bslbf |
|     marker | 1 | bslbf |
|     PTS[14..0] | 15 | bslbf |
|     marker | 1 | bslbf |
|     track_number | 16 | uimsbf |
|     pX_sectors_to_read | 24 | uimsbf |
|     pX_sectors_from_start | 24 | uimsbf |
|     pX_offset_next_section | 32 | imsbf |
|     pX_offset_previous_section | 32 | imsbf |
|     pX_offset_next_track | 32 | imsbf |
|     pX_offset_start_track | 32 | imsbf |
|     pX_track_tc_hours_1 | 4 | bslbf |
|     pX_track_tc_hours_2 | 4 | bslbf |
|     pX_track_tc_minutes_1 | 4 | bslbf |
|     pX_track_tc_minutes_2 | 4 | bslbf |
|     pX_track_tc_seconds_1 | 4 | bslbf |
|     pX_track_tc_seconds_2 | 4 | bslbf |
|     pX_track_tc_CC. | 2 | bslbf |
|     pX_track_tc_frames_1 | 4 | bslbf |
|     pX_track_tc_frames_2 | 4 | bslbf |
|     pX_path_tc_hours_1 | 4 | bslbf |
|     pX_path_tc_hours_2 | 4 | bslbf |
|     pX_path_tc_minutes_1 | 4 | bslbf |
|     pX_path_tc_minutes_2 | 4 | bslbf |
|     pX_path_tc_seconds_1 | 4 | bslbf |
|     pX_path_tc_seconds_2 | 4 | bslbf |
|     pX_path_tc_CC. | 2 | bslbf |
|     pX_path_tc_frames_1 | 4 | bslbf |
|     pX_path_tc_frames_2 | 4 | bslbf |
| } | | |

FIG.16

DATA RECORDING METHOD AND APPARATUS, DATA RECORDED MEDIUM AND DATA REPRODUCING METHOD AND APPARATUS

This application is a continuation of Ser. No. 08/690,873 Aug. 1, 1996, now U.S. Pat. No. 5,881,203.

BACKGROUND OF THE INVENTION

1. Field of the Invention

This invention relates to a data recording method and apparatus, a data record (recording/recordable/recorded) medium and a data reproducing method and apparatus employed with advantage for compressing and time-divisionally multiplexing digital moving picture data and digital speech data and for recording/reproducing the data on or from, for example, an optical disc.

2. Description of the Related Art

In video works, such as motion pictures, there are occasions wherein plural works having basically the same contents and slightly different in details, that is different in version, under variable circumstances. For example, a so-called directors cut edition, later edited by a director, may exist in addition to the first edition shown in a theater. Specifically, although part of the photographed scenes are cut or modified in the first edition from reasons related to management or under political or cultural backgrounds, these cut or modified scenes may be revived in reediting for taking changes in the backgrounds or the author's intentions into account. These are identified as director's cut editions, complete editions, special editions and so forth. Three or more different versions may be occasionally derived from one and the same work.

In addition to the versions for showing in a theater, an original work may be edited for matching to the broadcasting time for e.g., television broadcasting or matching to a recording/reproducing apparatus of relatively short play time for household entertainment.

In addition, motion pictures or video works shown for indefinite audience are designated for being shown only for adults (rating). The rating is voluntarily applied by the maker to a motion picture for prohibiting the nonage from viewing it if the motion picture includes inappropriate expressions for nonage. Similarly, a rated video disc, for example, is prohibited from being sold or assigned to the nonage.

The rating in US is not provided by law but is a voluntary process followed by the maker inclusive of the distributer and seller. According to a literature "THE MOVIE BUSINESS BOOK, pp. 396 to 406, "THE VOLUNTARY MOVIE RATING SYSTEM", the motion picture is classed into five categories, namely G (General Audiences; All Ages Admitted), PG (Parental Guidance Suggested); some material may not be suitable for children); PG-13 (Parents Strongly Cautioned, Some material may be inappropriate for children under 13; R (Restricted, under 17 requires accompanying parent or adult guardian); and NC-17 (No Children under 17 admitted).

Therefore, under these designations, admittance to a theater or the sale of video tapes or the like is restricted. Heretofore, a sole rating level is set for a given motion picture and referred to in a theater or a video shop for taking the age of the admitted or purchasing persons into account. In contrast to these voluntary process, there is also an idea of compulsorily prohibiting a rated video disc from being viewed by the nonage on the side of a reproducing apparatus. In this case, a flag for discriminating the possible rating is written on a video disc for detection by the reproducing apparatus for prohibiting reproduction. This function is termed a rating system, referred to hereinafter simply as rating.

In an European digital broadcasting system, there is a description "Parental Rating" in the definition of the service information. This broadcasting system provides a method for describing the age based on which the rating is allowed to come into operation by a receiving apparatus. In the above-mentioned rating system, if only a certain scene in a program is objectionable, an identification code is recorded at a position directly before the program starting. If the reproducing apparatus is in a rating mode, this identification code is read and the program is discontinued without being reproduced. In this case, the program in its entirety cannot be viewed.

SUMMARY OF THE INVENTION

It is therefore an object of the present invention to provide a data recording method and apparatus, a data record medium and a data reproducing method and apparatus for coping with plural versions or rating modes in such a manner that the reproducing system selects a reproducing channel of speech data matched to the reproducing pattern of video data for reproducing the speech data and video data matched to the reproducing pattern.

A data recording method according to the present invention divides video data and plural channels of language data into packets as units, and records the video data and the plural channels of language data on a record medium along with the control information containing a flag designating a reproducing channel of the language data matched to a reproducing pattern of the video data. Thus it becomes possible to record video data and plural channels of language data on a record medium so that a reproducing channel for the language data matched to the reproducing pattern of the video data will be selected and the plural channels of language data matched to the reproducing pattern and the video data will be reproduced by a reproducing system.

With the data recording method according to the present invention, the video data and the plural channels of language data are multiplexed and recorded on a record medium along with the control information containing a flag designating a reproducing channel of the language data matched to a reproducing pattern of the video data. Thus it becomes possible to record video data and plural channels of language data on a record medium so that a reproducing channel for the language data matched to the reproducing pattern of the video data will be selected and the plural channels of language data matched to the reproducing pattern and the video data will be reproduced by a reproducing system.

With the data recording method according to the present invention, the video data and the plural channels of the language data are multiplexed and recorded on a record medium, and the control information containing a flag designating the reproducing channel of the language data matched to the reproducing pattern of video data is recorded in a pre-set area on the record medium. Thus it becomes possible to record video data and plural channels of language data on a record medium so that a reproducing channel for the language data matched to the reproducing pattern of the video data will be selected and the plural channels of language data matched to the reproducing pattern and the video data will be reproduced by a reproducing system.

With the data recording method according to the present invention, speech data, for example, is recorded as the language data on the record medium. Thus it becomes possible to record video data and plural channels of speech data on a record medium so that a reproducing channel for the speech data matched to the reproducing pattern of the video data will be selected and the plural channels of speech data matched to the reproducing pattern and the video data will be reproduced by a reproducing system.

With the data recording method according to the present invention, speech data and/or title data, for example, is recorded as the language data on the record medium. Thus it becomes possible to record video data and plural channels of speech data and/or title data on a record medium so that a reproducing channel for the speech data and/or title data matched to the reproducing pattern of the video data will be selected and the plural channels of speech data and/or title data matched to the reproducing pattern and the video data will be reproduced by a reproducing system.

Thus, with the data recording method according to the present invention, video data and plural channels speech data and/or plural channels of title data are divided into packets as units and recorded on a record medium in a multiplexed or separate form along with the control information containing a flag designating a reproducing channel for the speech data and the title data matched to the reproducing pattern of the video data. Thus it becomes possible to record video data and plural channels of speech data and plural channels of title data on a record medium so that a reproducing channel for the speech and title data matched to the reproducing pattern of the video data will be selected and the speech and title data matched to the reproducing pattern and the video data will be reproduced by a reproducing system.

With a data recording apparatus according to the present invention, packet dividing means divides video data and plural channels of language data into packets as units, and control information generating means generates the control information containing a flag designating a reproducing channel of language data matched to a reproducing pattern of the video data, while recording means records the video data and the plural channels of language data along with the control information generated by the control information generating means on a record medium. Thus it becomes possible to record video data and plural channels of language data on a record medium so that a reproducing channel for the language data matched to the reproducing pattern of the video data will be selected and the plural channels of language data matched to the reproducing pattern and the video data will be reproduced by a reproducing system.

With the data recording apparatus according to the present invention, the video data and the plural channels of language data are multiplexed and recorded on a record medium along with the control information containing a flag designating a reproducing channel of the language data matched to a reproducing pattern of the video data. Thus it becomes possible to record video data and plural channels of speech data on a record medium so that a reproducing channel for the speech data matched to the reproducing pattern of the video data will be selected and the plural channels of language data matched to the reproducing pattern and the video data will be reproduced by a reproducing system.

With the data recording apparatus according to the present invention, the video data and the plural channels of the language data are multiplexed and recorded on a record medium, and the control information containing a flag designating the reproducing channel of the language data matched to the reproducing pattern of video data is recorded in a pre-set area on the record medium. Thus it becomes possible to record video data and plural channels of speech data on a record medium so that a reproducing channel for the speech data matched to the reproducing pattern of the video data will be selected and the plural channels of language data matched to the reproducing pattern and the video data will be reproduced by a reproducing system.

With the data recording apparatus according to the present invention, speech data, for example, is recorded as the language data on the record medium. Thus it becomes possible to record video data and plural channels of speech data on a record medium so that a reproducing channel for the speech data matched to the reproducing pattern of the video data will be selected and the plural channels of language data matched to the reproducing pattern and the video data will be reproduced by a reproducing system.

With the data recording apparatus according to the present invention, speech data and/or title data, for example, is recorded as the language data on the record medium. Thus it becomes possible to record video data and plural channels of speech data on a record medium so that a reproducing channel for the speech data matched to the reproducing pattern of the video data will be selected and the plural channels of speech data matched to the reproducing pattern and the video data will be reproduced by a reproducing system.

With the data recording apparatus according to the present invention, video data and plural channels speech data and/or plural channels of title data are divided into packets as units by packet dividing means and recorded on a record medium in a multiplexed or separate form by recording means along with the control information generated by control information generating means and containing a flag designating a reproducing channel for the speech data and the title data matched to the reproducing pattern of the video data. Thus it becomes possible to record video data and plural channels of speech data and plural channels of title data on a record medium so that a reproducing channel for the speech and title data matched to the reproducing pattern of the video data will be selected and the speech and title data matched to the reproducing pattern and the video data will be reproduced by a reproducing system.

A data record medium according to the present invention has recorded thereon video data and plural channels of language data, divided into packets as units, and the control information containing a flag designating a reproducing channel of the language data matched to a reproducing pattern of the video data. Thus it becomes possible for the reproducing system to select the reproducing channel of language data matched to a reproducing pattern of the video data and to reproduce the language data matched to the reproducing pattern and the video data.

With the data record medium according to the present invention, video data and plural channels of language data are multiplexed and recorded thereon along with the control information containing a flag designating a reproducing channel of the language data matched to a reproducing pattern of the video data. Thus it becomes possible for the reproducing system to select the reproducing channel of language data matched to a reproducing pattern of the video data and to reproduce the language data matched to the reproducing pattern and the video data.

With the data record medium according to the present invention, video data and plural channels of the language data are multiplexed and recorded thereon, and the control information containing a flag designating the reproducing channel of the language data matched to the reproducing pattern of the video data is recorded in a pre-set area thereof. Thus it becomes possible for the reproducing system to select the reproducing channel of language data matched to a reproducing pattern of the video data and to reproduce the language data matched to the reproducing pattern and the video data.

With the data record medium according to the present invention, speech data, for example, is recorded as the language data on the record medium. Thus it becomes possible for the reproducing system to select the reproducing channel of speech data matched to a reproducing pattern of the video data and to reproduce the speech data matched to the reproducing pattern and the video data.

With the data record medium according to the present invention, speech data and/or title data, for example, is recorded as the language data on the record medium. Thus it becomes possible for the reproducing system to select the reproducing channel of speech data and/or the title data matched to a reproducing pattern of the video data and to reproduce the speech data and/or the title data matched to the reproducing pattern and the video data.

With the data record medium according to the present invention, video data and plural channels of speech data and/or plural channels of title data are divided into packets as units and recorded in a multiplexed or separate form with the control information containing a flag designating a reproducing channel for the speech data and/or the title data matched to the reproducing pattern of the video data. Thus it becomes possible for the reproducing system to select the reproducing channel of speech data and title data matched to a reproducing pattern of the video data and to reproduce the speech data and/or the title data matched to the reproducing pattern and the video data.

With the data reproducing method according to the present invention, a reproducing channel for language data matched to a reproducing pattern of video data is selected based on a flag contained in the control information for reproducing the language data matched to the reproducing pattern and the video data.

With the data reproducing method according to the present invention, the control information is reproduced from a record medium having the video data and the plural channels of language data multiplexed and recorded thereon along with the control information containing a flag designating a reproducing channel of the language data matched to a reproducing pattern of the video data, and a reproducing channel of language data matched to a reproducing pattern of the video data is selected based on the flag contained in the control information for reproducing the language data matched to the reproducing pattern and the video data. Thus it becomes possible to reproduce video data and language data matched to the reproducing pattern.

With the data reproducing method according to the present invention, the control information is reproduced from a record medium on which the video data and the plural channels of the language data are multiplexed and recorded and in a pre-set area of which the control information containing a flag designating the reproducing channel of the language data matched to the reproducing pattern of video data is recorded, and a reproducing channel of language data matched to a reproducing pattern of the video data is selected based on the flag contained in the control information. Thus it becomes possible to reproduce the language data matched to the reproducing pattern and the video data.

With the data reproducing method according to the present invention, speech data, for example, is reproduced as the language data from the data record medium for reproducing the speech data matched to the reproducing pattern of video data along with the video data.

With the data reproducing method according to the present invention, speech data and/or title data, for example, is reproduced as the language data from the data record medium for reproducing the speech data and/or the title data matched to the reproducing pattern of video data along with the video data.

With an apparatus for reproducing video data and plural channels of language data from a record medium having recorded thereon the video data divided into packets as units and plural channels of language data also divided into packets as units, and also having recorded thereon the control information containing a flag designating a reproducing channel of the language data matched to a reproducing pattern of the video data, flag detection means is provided for detecting a flag contained in the control information, and reproducing processing means is provided for selecting a reproducing channel of language data matched to a reproducing pattern of the video data based on a detection output of the flag detection means. Thus it becomes possible to reproduce the language data matched to the reproducing pattern and the video data.

With the data reproducing apparatus according to the present invention, flag detection means detects a flag contained in the control information reproduced from a data record medium having the video data and the plural channels of language data multiplexed and recorded thereon along with the control information containing a flag designating a reproducing channel of the language data matched to a reproducing pattern of the video data. The reproducing processing means selects a reproducing channel of language data matched to the reproducing pattern of the video data for reproducing the language data matched to the reproducing pattern and the video data.

With the data reproducing apparatus according to the present invention, the flag detection means detects a flag contained in the control information reproduced from a data record medium on which the video data and the plural channels of the language data are multiplexed and recorded thereon, and in a pre-set area thereon of which the control information containing a flag designating the reproducing channel of the language data matched to the reproducing pattern of video data is recorded. Based on the detection output, the reproducing processing means selects the reproducing channel of language data matched to the reproducing pattern of the video data for reproducing video data and the language data matched to the reproducing pattern of the video data.

With the data reproducing apparatus according to the present invention, the reproducing processing means reproduces speech data matched to the reproducing patter of the video data from the data record medium along with the video data.

With the data reproducing apparatus according to the present invention, the reproducing processing means reproduces speech data and/or title data matched to the reproducing pattern of the video data from the data record medium along with the video data.

BRIEF DESCRIPTION OF THE DRAWINGS

FIG. 4 illustrates Program_Stream_Directory in the entry sector.

FIG. 5 illustrates the contents of Program_Stream_Map in the entry sector.

FIG. 6 illustrates the contents of description of Program Stream_Map.

FIG. 7 illustrates the contents of dvd_audio_descriptor( ) described in the Program_Stream_Map.

FIG. 8 illustrates the contents of dvd_lpcm_descriptor( ) described in the Program_Stream_Map.

FIG. 9 illustrates the contents of dvd_subtitle descriptor( ) described in the Program_Stream_Map.

FIG. 10 illustrates the contents of subtitle_type described in dvd_subtitle_descriptor( ).

FIG. 13 illustrates a typical structure of TOC data.

FIG. 16 illustrates the contents of path_descriptor( ) described in global_descriptor 89 in Program_Stream_Map in the entry sector.

DESCRIPTION OF THE PREFERRED EMBODIMENTS

Figure 1:
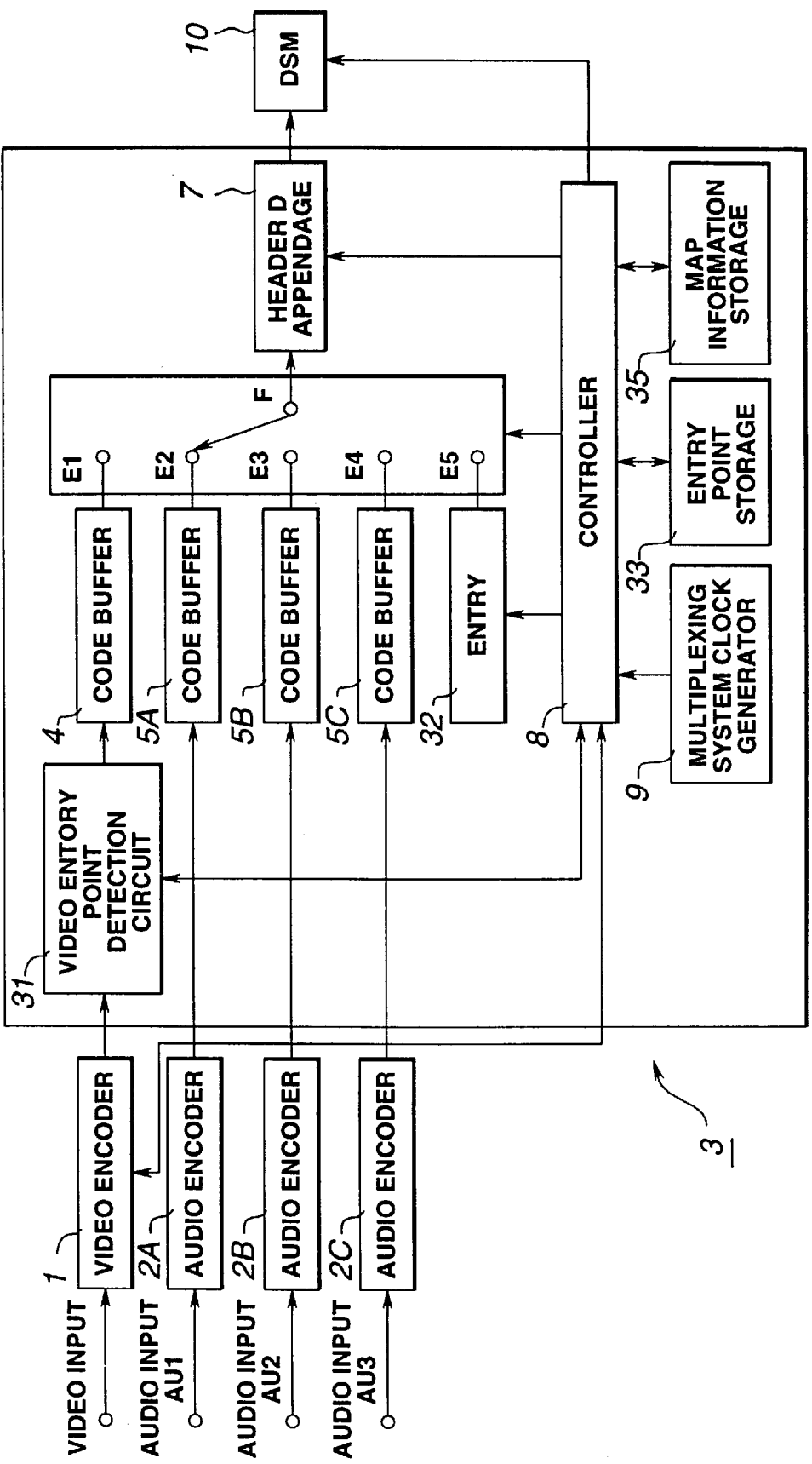
FIG. 1 is a block diagram showing the structure of a data encoding apparatus according to the present invention.

Referring to the drawings, preferred embodiments of the present invention will be explained in detail. The data encoding method according to the present invention is implemented by a data encoding apparatus configured as shown for example in FIG. 1.

The data encoding apparatus, shown in FIG. 1, includes a video encoder 1 for encoding video signals for compression, and audio encoders 2A, 2B and 2C for packetizing audio signals of, for example, three routes, that is AU1, AU2 and AU3. The data encoding apparatus also includes a multiplexer 3 connected to the video encoder 1 and to the audio encoders 2A to 2C.

In the above encoding apparatus, an output terminal of the video encoder 1 is connected to an input terminal of a video entry point detection circuit 31 of the multiplexer 3. An output terminal of the video entry point detection circuit 31 is connected to an input terminal of a code buffer 4. An entry sector generating circuit 32 is responsive to a control input of a controller 8 and routes its output to an input terminal E3 of a switching circuit 6. The controller 8 is also responsive to system clocks outputted by a multiplexing system clock generating circuit 9 to connect input terminals E1, E2, E3, E4 and E5 of the switching circuit 6 sequentially to an output terminal F in a pre-set period for sequentially taking out data from the code buffers 4, 5A, 5B and 5C or from the entry sector generating circuit 32, for time division multiplexing the data and for routing the data to a header appendage circuit 7.

The controller 8 also controls the header appendage circuit 7 for appending a video packet header to video data read out from the video packet header and for appending an audio packet header to audio data read out from the audio packet header.

The controller 8 is responsive to an input of an entry point generating signal generated at an I-picture generating timing from the video encoder 1 or from the video entry point detection 31 and controls the entry sector generating circuit 32 for inserting an entry sector at a pre-set position of a bitstream. If the video encoder 1 is configured for outputting an entry point generating signal, the video encoder 1 outputs an entry point generating signal at a generating timing of the I-picture.

If the video encoder 1 is unable to output an entry point generating signal, or a pre-encoded video bitstream is multiplexed, the video entry point detection circuit 31 generates an entry point generating signal at a generating timing of an I-picture, or detects an entry point from video data supplied from the video encoder 1 to output an entry point generating signal. An entry point storage unit 33 is a memory capable of reading and writing data from the controller 8 and stores the position of the detected entry point.

A MAP information storage device 35 stores the information entered from an external input device, and is controlled by the controller 8 so that the information stored therein will be read out each time the information constitutes an entry sector and subsequently stored in the entry sector. If the information is such information as uses the position of a future entry sector, the position of the entry sector is read out from the entry point storage device 33 and supplied to a DSM 10 for recording therein.

Figure 2:
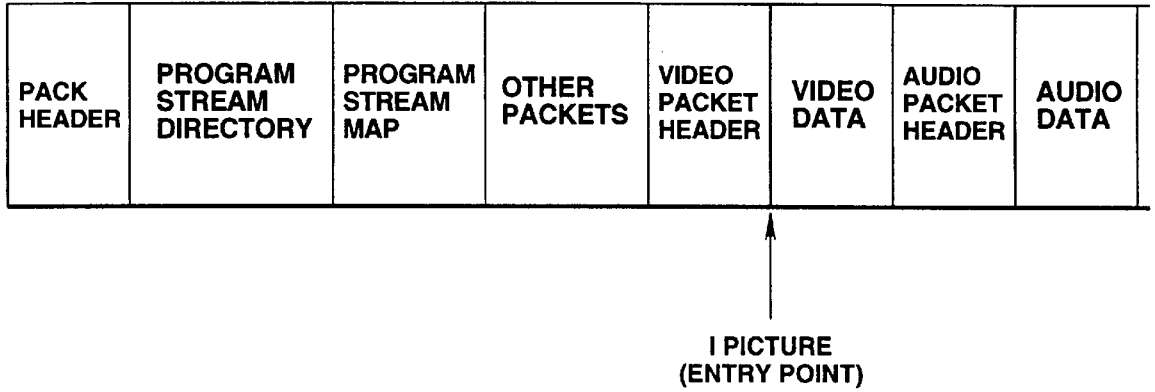
FIG. 2 illustrates a pack format of a disc format in the data encoding apparatus shown in FIG. 1.

In the data encoding device shown in FIG. 1, a multiplexed bitstream is made up of at least one pack and ISO 11172 end code. Each pack is constituted by a format as shown for example in FIG. 2.

That is, at the leading end of a pack is placed a header Pack Header made up of Pack_Start_Code, SCR and MUX_Rate, followed by Video_Packet_Header and video data, not containing an I-picture in a sector configuration, in this order. Next to the video data is arrayed Entry_Packet, followed by Video_Packet Header and video data containing the I-picture in a sector configuration, in this order. Directly before video data containing the I-picture (entry point), that is directly before Video_Packet_Header, is arrayed Entry_Packet. In the present embodiment, Audio_Packet_Header is arrayed next to video data and audio data of a sector structure is arrayed next to Audio_Packet Header.

Figure 3:
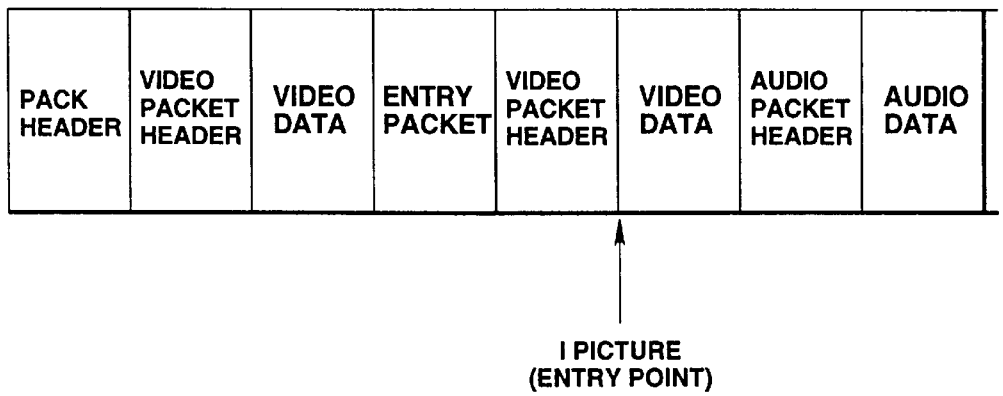
FIG. 3 illustrates a format for an entry sector.

The entry sector Entry_Packet is of a format shown in FIG. 3. At a leading end of the entry sector shown in FIG. 3 is arrayed Pack Header made up of Pack_Start_code, SCR and MUX_Rate, followed by Program_Stream_Directory and Program_Stream_Map in this order. In the present embodiment, there is arrayed a packet other than a video packet, followed by video data inclusive of an I-picture. In the present embodiment, since the information appears from the leading end of the sector in a pre-set sequence, the information can be handled easily.

The directory Program_Stream_Directory is of a structure defined by the MPEG2 system standard and is used for indicating the accessible position in a stream. By traversing the loop A shown in FIG. 4 seven times, the positions of three forward intra-pictures, one directly backward intra-picture and three backward entry points are recorded.

The map program_Stream_Map is defined as shown for example in FIG. 5. In loops B and C in FIG. 5 are placed descriptors ( ) for accommodating a variety of information data, as shown in FIG. 6. In the present embodiment, div audio descriptor ( ) shown in FIG. 7 is defined as a descriptor ( ) contained in the loop C in Program Stream_Map. Also, dvd_lpcm_descriptor( ) shown in FIG. 8 and dvd subtitle descriptor( ) shown in FIG. 9 are defined.

In FIG. 7, dvd_audio_descriptor( ) is a descriptor used for audio data compressed by MPEG Audio. The flag path number flag N is a 1-bit flag which is set to 1 or 0 if an audio stream is to be reproduced by a path number N or is not to be reproduced, respectively. On the other hand, channel_configuration denotes the number of encoded channels in the audio bitstream.

In FIG. 8, dvd_lpcm descriptor is a 4-bit code defining an audio mix type in LPCM. The flag path_number_flag N is a 1-bit flag which is set to 1 or 0 if an audio stream is to be reproduced by a path number N or is not to be reproduced, respectively.

On the other hand, subtitle_type in dvd_subtitle descriptor( ) shown in FIG. 9 is a 4-bit code defining the type of the subtitle stream shown in FIG. 10, while aspect_ratio information is a 4-bit code defining the display aspect of the subtitle stream. The flag path_number_flag_N is a 1-bit flag which is set to 1 or 0 if an audio stream is to be reproduced by a pass number N or is not to be reproduced, respectively.

Figure 12:
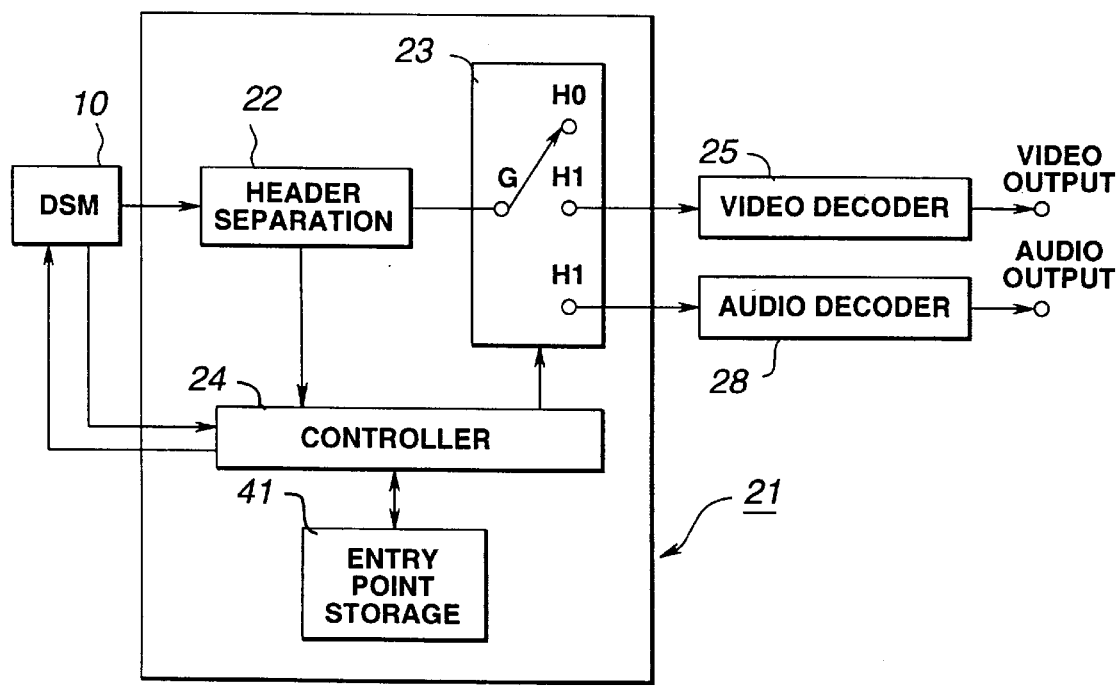
FIG. 12 shows an array f data in a DSM in the data encoding apparatus.

The data array on the DSM 10 is configured as shown in FIG. 12. That is, the information comprised of a collection of multiplexed streams termed table-of-contents (TOC) and multiplexed streams are sequentially recorded beginning from the inner rim side of the disc.

The TOC data is recorded as shown for example in FIG. 13. That is, the number of the multiplexed streams in the disc is first recorded. The loop is traversed in a number of times corresponding to the number of multiplexed streams for recording the information of each multiplexed stream.

In the loop are first recorded the leading and last sector addresses of the multiplexed streams, followed by Program_Stream Map defined as shown in FIG. 5. This is the same as the map recorded in the stream. That is, dvd_audio_descriptor( ), dvd_lpcm descriptor( ) and dvd_subtitle_descriptor( ) shown in FIGS. 7, 8 and 9, respectively, are defined in Program_Stream_Map.

The operation of the data encoding apparatus shown in FIG. 1 is now explained. The controller 8 receives an entry point generating signal from the video encoder 1 or from the video entry point detection circuit 31 and causes an entry sector to be inserted directly before the video entry point. That is, on reception of the entry point generating signal, the controller 8 causes an entry packet to be generated in the entry sector generating circuit 32. The controller 8 then sets a movable contact of the switching circuit 6 to the input terminal E3 to cause the packet to be routed to the header appendage circuit 7 for multiplexing with video data from the code buffers 4, 5A, 5B and 5C and audio data of the respective channels.

The respective elementary streams of the above video data and the audio data of the respective channels are recorded in such a manner that the types of the elementary streams are defined by stream type in Program_Stream_Map and also in such a manner that a flag specifying a reproducing channel of audio data matched to the reproducing pattern or path of the video data is supplied by dvd_audio_descriptor( ) or dvd_lpcm_descriptor( ).

It is assumed that three routes of audio signals AU1, AU2 and AU3 are all recorded with compression by DVD audio, the audio signal AU1 is the general speech, while the audio signals AU2 and AU3 are speech for adults and for children, respectively. With the reproducing pattern of video signals for general use, reproduction of the audio signals AU1 and AU3 among the three routes of the audio signal AU1 to AU3 is allowed. With the reproducing pattern or path 1 for adults, reproduction of all of the audio signals AU1 to AU3 is allowed, whereas, with the reproducing pattern or path 2 of video signals for children, only reproduction of the audio signals AU3 is allowed.

That is, in dvd_audio_descriptor( ) in PSM defining attributes of data associated with the speech for general use, the flags path_number_flag 0 and path number flag 2 are set to 1, while the flag path number flag 1 is set to 0.

On the other hand, in dvd_audio_descriptor( ) in the PSM defining attributes of data for adult speech, the flags path number flag are all set to 1.

In dvd_audio_descriptor( ) in PSM defining attributes of data associated with the speech for children, the flag path number flag 2 is set to 1, while the flags path number flag 0 and path number flag 1 is set to 0.

Alternatively, the reproducing channels may be fixed from one reproducing pattern to another, so that reproduction of the audio signals AU1, AU2 and AU3 will be allowed with reproducing patterns path 1, reproducing patterns path 2 and reproducing patterns path 3, respectively.

Stated differently, only the flag path_number_flag 0, the flag path_number_flag 1 or the flag path_number_flag 2 are set to 1 for the general speech, for speech for adults and for speech for children, respectively.

For providing the structure shown in FIG. 12, the data encoding apparatus shown in FIG. 1 operates as follows: First, the TOC area is procured. This procures an area for the DSM 10 in advance for matching with the number of the designated multiplexed streams. The encoding as described above is then performed.

Each time the encoding of a multiplexed stream is completed, the data encoding apparatus shown in FIG. 1 updates the TOC data. That is, dvd_audio_descriptor( ), dvd_lpcm descriptor( ) and dvd Subtitle_descriptor( ), which are the same as those described in the entry point information, are recorded as the leading and last sector addresses of the encoded multiplexed streams.

In this manner, the reproducing channel of speech data matched to the reproducing pattern of the video data are designated by the flags for encoding.

Figure 11:
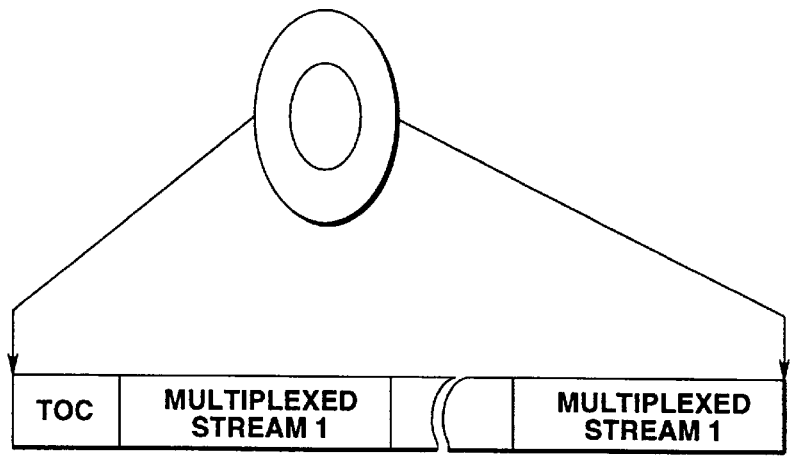
FIG. 11 is a block diagram showing the structure of a data decoding apparatus embodying the present invention.

Referring to FIG. 11, a data decoding apparatus according to an embodiment of the present invention is explained. The data decoding apparatus shown in FIG. 11 decodes data reproduced from the DSM 10 having recorded thereon data encoded by the data encoding apparatus shown in FIG. 1.

In this data decoding apparatus, a header separation circuit 22 of the separation device 21 separates a pack header, a sector header and an entry sector from data read out from the DSM 10 and routes the separated data to a controller 24, while routing time-divisional multiplexed data to an input terminal G of a switching circuit 23. The switching circuit 23 has its output terminals H1 and H2 connected to an input terminal of an audio decoder 26.

The controller 24 reads out the information concerning an entry point from data supplied from the header separation circuit 22 and causes the read-out data to be routed to and stored in an entry point storage unit 33. Since the controller 24 is fed with the information concerning the current readout position from the DSM 10, the controller 24 can store the position of the entry point in association with its contents.

In accordance with stream_id of the sector header supplied from the header separation circuit 22, the controller 24 of the separation device 21 causes an input terminal G of the switching circuit 23 to be sequentially connected to output terminals H1 and H2 thereof for routing video data and audio data to the video decoder 25 and to the audio decoder 26, respectively.

If there is sufficient capacity allowance in a storage circuit of the controller 24, the following operation s feasible. That is, prior to reproduction, the controller reads out the TOC shown in FIG. 12 for storage in its own storage circuit. This enables the processing to be performed without the necessity of fetching the information each time the multiplexed stream is reproduced.

With the present decoding apparatus for the multiplexed data, the controller 24 controls the reproducing operation so that it selects an audio stream by the path designated by the path designation signal as set by the user and the information on the path of the multiplexed bitstream for causing audio data matched to the video data to be decoded by the audio decoder 26.

If, with the above-described decoding apparatus for multiplexed data, the audio signals AU1, AU2 and AU3 is the general speech, the speech for adults and the speech for children, respectively, the audio signal AU1 or AU3 can be decoded by designation by the path designation signal for the reproducing pattern path 0 for general video signals, while any of the audio signals AU1 to AU3 can be decoded by designation by the path designation signal for the reproducing pattern path 1 for adults. Only the audio signal AU3 can be decoded by the reproducing pattern path 2 for children.

Figure 14:
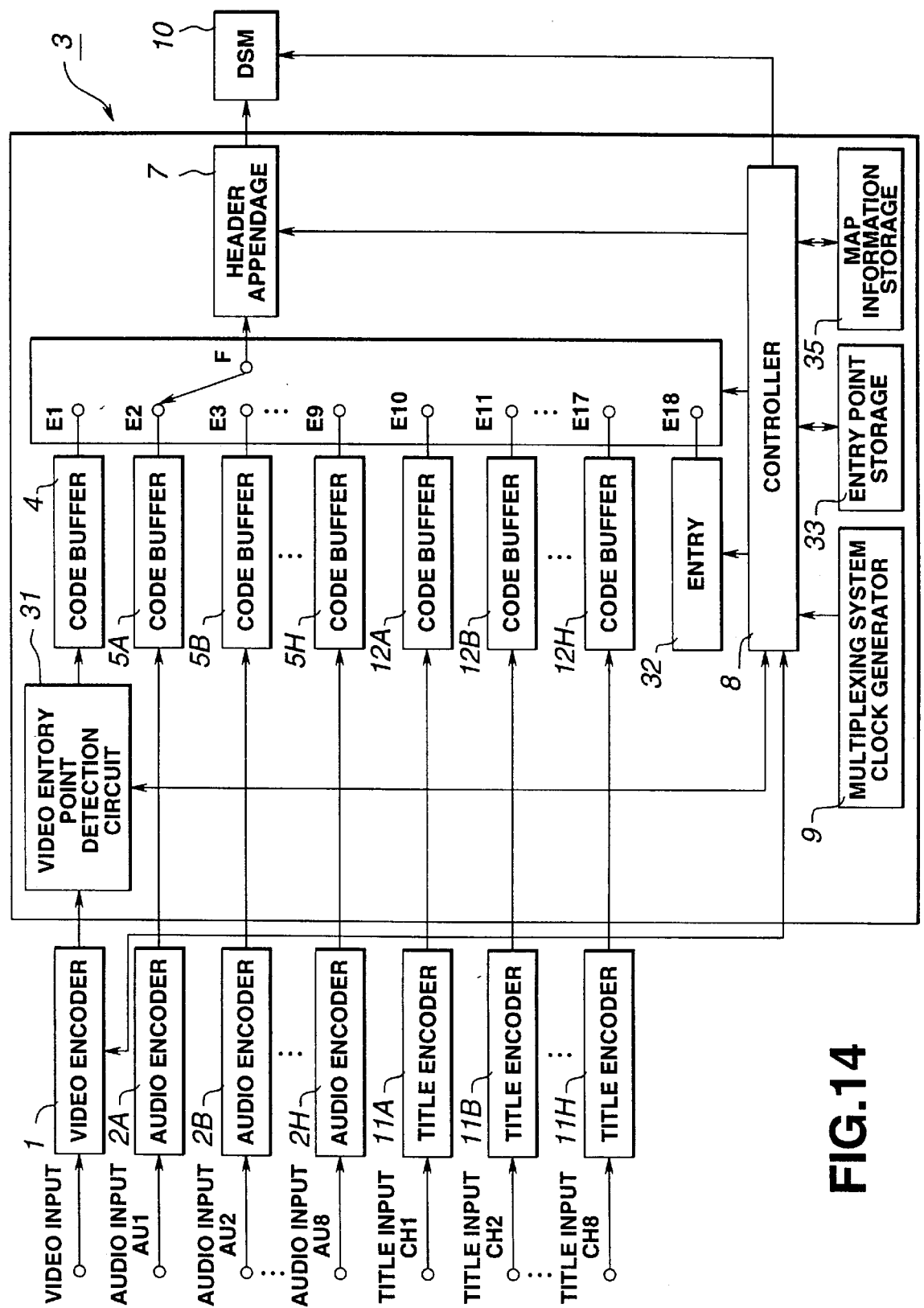
FIG. 14 is a block diagram showing the structure of the data encoding apparatus embodying the present invention.
Figure 15:
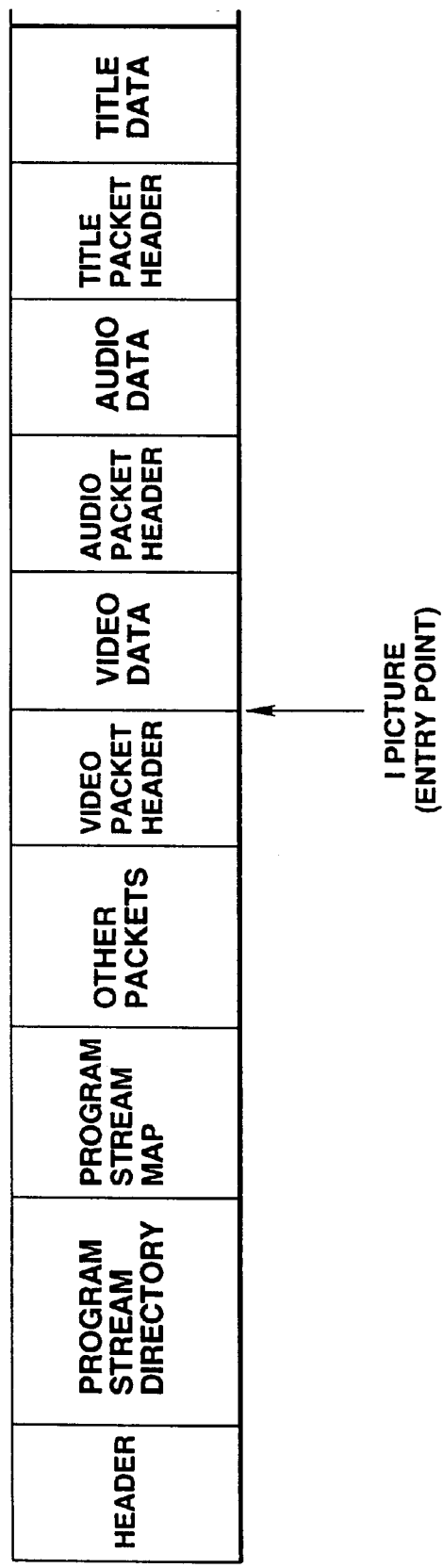
FIG. 15 illustrates a format of an entry sector in the data encoding apparatus.

The data encoding method according to the present invention may be implemented by a data encoding apparatus shown for example in FIG. 14.

The data encoding apparatus shown in FIG. 14 is configured for handling eight routes of audio signals in the data encoding apparatus shown in FIG. 1, and includes title encoders 11A to 11H and code buffers 12A to 12H configured for packetizing associated eight routes of the tile data.

The controller 8 is responsive to system clocks outputted by the multiplexed system clock generating circuit 9 to interconnect input terminals E1 to E18 of the switching circuit 6 to its output terminal F in a pre-set period in order to take out data from the code buffers 4, 5A to 5H and 12A to 12H or the entry sector generating circuit 32. The controller causes the data to be time-divisionally multiplexed and outputted to the header appendage circuit, 7. The controller 8 also controls the header appendage circuit 7 to append a video packet header to video data read out from the code buffer 4. The controller also appends an audio packet header to audio data read out from the code buffers 5A to 5H, while appending a title packet header to title data read out from the code buffers 12A to 12H. In addition, the controller 8 receives an entry point generating signal, generated at an I-picture generating timing, and controls the entry sector generating circuit 32 for inserting an entry sector at a pre-set position of the bitstream. If the video encoder 1 is configured for outputting an entry point generating signal, the video encoder 1 outputs an entry point generating signal at an I-picture generating timing.

If the video encoder 1 is unable to output an entry point generating signal, or a pre-encoded video bitstream is multiplexed, the video entry point detection circuit 31 generates an entry point generating signal at a generating timing of an I-picture, or detects an entry point from video data supplied from the video encoder 1 to output an entry point generating signal. An entry point storage unit 33 is a memory capable of reading and writing data from the controller 8 and stores the position of the detected entry point.

A MAP information storage device 35 stores the information entered from an external input device, and is controlled by the controller 8 so that the information stored therein will be read out each time the information constitutes an entry sector and subsequently stored in the entry sector. If the information is such information as uses the position of a future entry sector, the position of the entry sector is read out from the entry point storage device 33 and supplied to the DSM 10 for recording therein.

In the data encoding apparatus, shown in FIG. 14, there is arrayed at the leading end of a pack a header Pack_Header made up of Pack_Start_Code, SCR and MUX_Rate, followed by Video_Packet Header and video data, not containing an I-picture in a sector configuration, in this order. Next to the video data is arrayed Entry_Packet, followed by Video_Packet_Header and video data containing the I-picture in a sector configuration, in this order. Directly before video data containing the I-picture (entry point), that is directly before Video_Packet_Header, is arrayed Entry Packet. In the present embodiment, Audio_Packet_Header is arrayed next to video data and audio data of a sector structure is arrayed next to Audio_Packet_Header.

The entry sector Entry_Packet is of a format shown in FIG. 3. At a leading end of the entry sector shown in FIG. 3 is arrayed Pack Header made up of Pack_Start_code, SCR and MUX_Rate, followed by Program_Stream_Directory and Program_Stream_Map in this order. In the present embodiment, there is arrayed a packet other than a video packet, followed by video data inclusive of an I-picture. In the present embodiment, since the information appears from the leading end of the sector in a pre-set sequence, the information can be handled easily. In this case, Audio_Packet Header is arrayed next to video data, followed by a sector structure of audio data. Next to the audio data is arrayed a title Packet_Header, followed by a sector structure of title data.

The above Program_Stream_Directory is of a structure defined by the MPEG2 system standard and is used for indicating the accessible position in a stream.

In Program_Stream_Map is defined global descriptor( ) in which is defined path_descriptor ( ) shown in FIG. 16.

The descriptor path_descriptor ( ) defines each path and has a syntax shown in FIG. 16. As shown therein, the descriptor describes path numbers path_number, track numbers track_number, sector numbers pX_sectors_to_read, pX_sectors_from_start, sector offsets pX_offset next section . . . pX_offset start track, track time codes pX_track_tc_hours_1 . . . pX_track_tc frames_2, pass time codes pX_path_tc_hours_1 . . . pX_path_tc frames_2.

The path number path_number is a 3-bit value according path numbers referred to by the descriptor.

The track number track_number is a 16-bit value equal to the current track number. It is an encoded value of a relative track number towards the program start position. The track numbers of the segments are used in common by a path or plural paths. The track number is incremented through paths. The absolute track number on the disc can be known by adding the track number offset provided by program_linkage in disc_toc ( ) to the relative track number.

The sector number pX_sectors_to_read is an integer without a sign for according the remaining number of sectors necessary until reading the program section of the path number X. If this value is N, N sectors inclusive of the current section are left until reading as far as the end of the section of the path.

The sector number pX_sectors_from_start is an integer without a sign which accords the number of sectors from the current sector of the path number X until the start position of the current section. If the value is 0, the current sector is the first sector of the section. If this value is N, there are N sectors, exclusive of the current sector, from the start position of the current section as far as the current sector.

The offset pX_offset_next_section is a sector offset from the current sector of the path of the path number as far as the entry sector of the start position of the next section. This offset is positive or negative and encoded in 2's complement form. If this value is 0, there is no section to be reproduced next to the section to which belongs the current sector, that is, the program has come to a close.

The offset pX_offset_previous_section is a sector offset from the current entry sector of the path of the path number X as far as the last entry sector of the previous section. This offset is positive or negative and encoded in 2's complement form. If this value is 0, there is no section to be reproduced before the section to which belongs the current sector, that is, the program has now started.

If the sector numbers (pX_sectors_to_read and pX_sectors from_start) and the above offsets (pX_offset_next_section and pX_offset_previous_section) are all zero, the path of the path number X is not used, or the entry sector is not a part of the path of the path number X.

The offset pX_offset_next_track is a sector offset from the current sector of the path of the path number X as far as the entry sector of the start position of the next current track. This offset is positive or negative and encoded in 2's complement form. If this value is 0, there is no next track on the path.

The offset pX_offset_start_track is a sector offset from the current sector of the path of the path number X as far as the entry sector of the start position of the current track. This offset is positive or negative and encoded in 2's complement form. If the current entry sector is the leading end of a track, this offset pX_offset_start_track is an offset to the start position of the previous track. If this value is 0, there is no previous. track on the pass.

The above is the manner of describing the path number of the section containing the current entry sector in the PSM in the entry sector.

The operation of an embodiment of a data encoding apparatus shown in FIG. 14 is now explained. The controller 8 receives an entry point generating signal from the video encoder 1 or from the video entry point detection circuit 31 and causes an entry sector to be inserted directly before the video entry point. That is, on reception of the entry point generating signal, the controller 8 causes an entry packet to be generated in the entry sector generating circuit 32. The controller 8 then sets a movable contact of the switching circuit 6 to the input terminal E18 to cause the packet to be routed to the header appendage circuit 7 for multiplexing with video data from the code buffers 4, 5A to 5H and 12A to 12H, audio data of the respective channels and title data of the respective channels.

The respective elementary streams of the above video data and the audio data of the respective channels are recorded in such a manner that the types of the elementary streams are defined by stream_type in Program_Stream_Map and also in such a manner that a flag specifying a reproducing channel of audio data matched to the reproducing pattern or path of the video data is supplied by dvd_audio_descriptor( ) or dvd_lpcm_descriptor( ).

Figure 17:
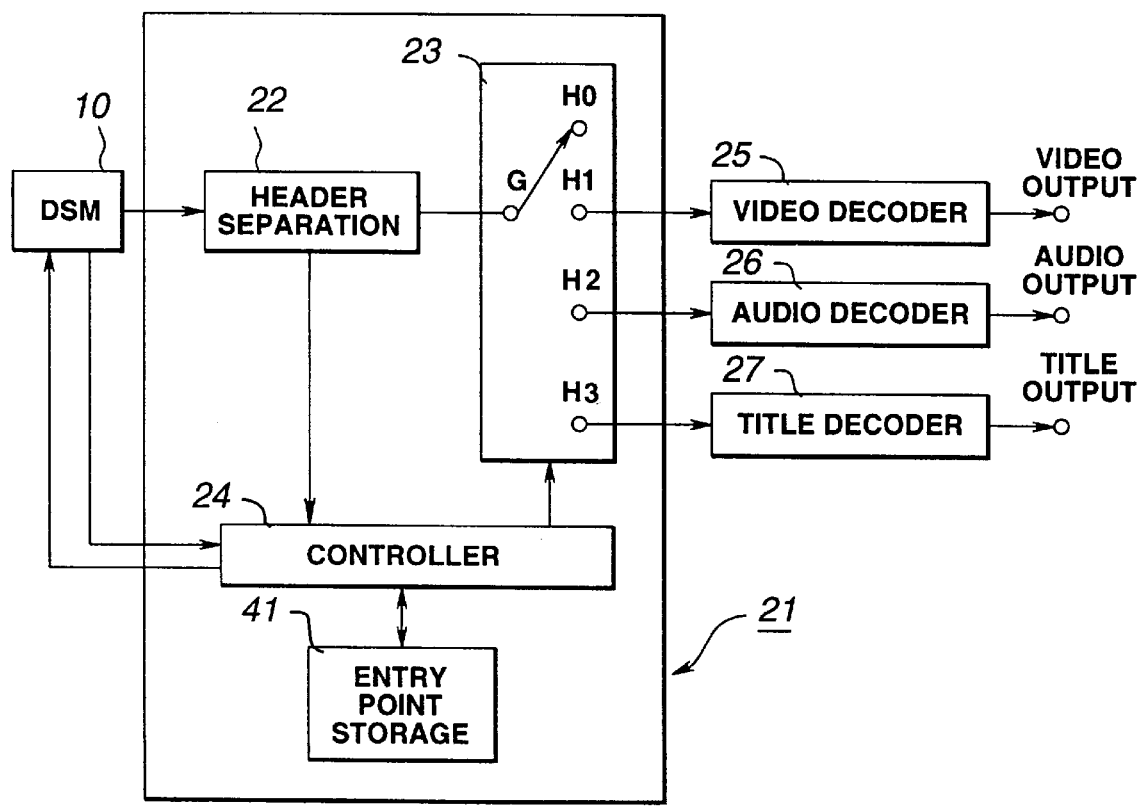
FIG. 17 is a block diagram showing the structure of a data decoding apparatus embodying the present invention.

Referring now to FIG. 17, a data decoding apparatus according to an embodiment of the present invention is explained. The data decoding apparatus shown in FIG. 17 is configured for decoding data reproduced from the DSM 10 having recorded thereon data encoded by the encoding apparatus shown in FIG. 14, and is similar to a data decoding apparatus except having further a title decoder 27.

In the present data decoding apparatus, the header separation circuit 28 of the separation device 21 separates the pack header, sector header and the entry sector from data read out from the DSM 10 and routes the separated data to the controller 24, while routing time-divisionally multiplexed data to the input terminal G of the switching circuit 23. The switching circuit 23 has its output terminals H1, H2 and H3 connected to input terminals of the video decoder 25, audio decoder 26 and the title decoder 27.

The controller 24 reads out the information concerning an entry point (entry sector information) from data supplied from the header separation circuit 22 and causes the read-out data to be routed to and stored in an entry point storage unit 41. Since the controller 24 is fed with the information concerning the current read-out position from the DSM 10, the controller 24 can store the position of the entry point in association with its contents.

In accordance with stream_id of the sector header supplied from the header separation circuit 22, the controller 24 of the separation device 21 causes the input terminal G of the switching circuit 23 to be sequentially connected to output terminals H1 to H3 thereof for routing video data and audio data to the video decoder 25 and to the audio decoder 26, respectively.

If there is sufficient capacity allowance in a storage circuit of the controller 24, the following operation is feasible. That is, prior to reproduction, the controller reads out the TOC for storage in its own storage circuit. This enables the processing to be performed without the necessity of fetching the information each time the multiplexed stream is reproduced.

In the present multiplexed data decoding apparatus, the controller 24 controls the reproducing operation so that it selects an audio stream and the title data by the path designated by the path designation signal as set by the user and the information on the path of the multiplexed bitstream for causing audio data matched to the video data and the title data to be decoded by the audio decoder 26 and by the title decoder 27, respectively.

With the above-described structure of the multiplexed data decoding apparatus, it is assumed that, among the eight routes of the audio signals AU1 to AU8, the audio signal AU1 is general English speech, the audio signal AU2 is general French speech, the audio signal AU3 is general Japanese speech, the audio signal AU4 is English speech for adults, the audio signal AU5 is French speech for adults, the audio signal AU6 is Japanese speech for adults, the audio signal AU7 is English speech for children, the audio signal AU8 is French speech for children, and the audio signal AU9 is Japanese speech for children. It is also assumed that, among the eight routes of the title signals CH1 to CH8, the title signal CH1 is general English title, the title signal CH2 is general French title, the title signal CH3 is general Japanese title, the title signal CH4 is English title for adults, the title signal CH5 is French title for adults, the title signal CH6 is Japanese title for adults, the title signal CH7 is English title for children, the title signal CH8 is French title for children, and the title signal CH9 is Japanese title for children.

With the reproducing pattern path 0 for general video signals, the audio signals AU1 to AU3 or AU7 and AU8 of the eight routes of the audio signal AU1 to AU8 can be decoded by designation with the path designation signal. With the reproducing pattern path 1 for adults, any of the eight routes of audio signals AU1 to AU8 can be decoded by designation by the path designation signals.

With the reproducing pattern path 1 for adults, any of the eight title signals CH1 to CH8 can be decoded, whereas, with the reproducing pattern path 2 for children, the title signals CH7 and CH8 may be decoded.

The on/off of audio data and title data in each reproducing pattern is designated by a 1-bit flag path_number_flag_N which is set to 1 or 0 if the audio stream is to be reproduced by the path number N or otherwise, respectively.

The attributes of the audio data recorded as general speech are such that, in dvd_audio_descriptor( ) in the PSM, path_number flag_0 and path_number_flag_2 are set to 1, while path_number flag_1 is set to 0.

The attributes of the title data recorded as general speech are such that, in dvd_subtitle_descriptor( ) in the PSM, path number_flag_0 and path_number_flag_2 are set to 1, while path number_flag_1 is set to 0.

The attributes of the audio data recorded as general speech for adults are such that, in dvd_subtitle descriptor( ) in the PSM, path_number_flag_0, path_number_flag_1, and path_number flag_2 are set to 1.

The attributes of the title data recorded as general speech for adults are such that, in dvd_subtitle descriptor( ) in the PSM, path_number_flag_0, path_number_flag_1, and path_number_flag 2 are set to 1.

The attributes of the audio data recorded as speech for children are such that, in dvd_audio_descriptor( ) in the PSM, path_number_flag_2 is set to 1, while path_number_flag_0 and path_number_flag_1 are set to 0.

The attributes of the title data recorded as speech for children are such that, in dvd_subtitle_-descriptor( ) in the PSM, path_number_flag_2 is set to 1, while path_number_flag_0 and path_number_flag_1 are set to 0.

What is claimed is:

1. A data recording method comprising the steps of:
   receiving video data including first and second reproducing patterns and plural (N) channels of language data;
   dividing said video data and said plural channels of language data into packets as units; and
   recording said video data and said plural channels of language data on a recording medium along with control information designating an available language data channel or channels for the first and second video data patterns such that all of the N plural channels of language data are available for said first video data pattern and only less than N of the channels of language data are available for said second video data pattern.

2. A data recording apparatus comprising:
   means for receiving video data including first and second reproducing patterns and plural (N) channels of language data;
   means for dividing said video data and said plural channels of language data into packets as units; and
   means for recording said video data and said plural channels of language data on a recording medium along with control information designating an available language data channel or channels for the first and second video data patterns such that all of the N plural channels of language data are available for said first video data pattern and only less than N of the channels of language data are available for said second video data pattern.

3. A data recording medium having recorded thereon video data including first and second reproducing patterns and plural (N) channels of language data, divided into packets as units, and control information designating an available language data channel or channels for the first and second video data patterns such that all of the N plural channels of language data are available for said first video data pattern and only less than N of the channels of language data are available for said second video data pattern.

4. A method for reproducing data from a data recording medium having recorded thereon video data including first and second reproducing patterns and plural (N) channels of language data, divided into packets as units, and control information designating an available language data channel or channels for the first and second video data patterns such that all of the N plural channels of language data are available for said first video data pattern and only less than N of the channels of language data are available for said second video data pattern, comprising:
   selecting a reproducing channel of language data matched to a selected reproducing pattern of said video data based on said control information; and
   reproducing the language data matched to said reproducing pattern of said video data.

5. An apparatus for reproducing data from a data recording medium having recorded thereon video data including first and second reproducing patterns and plural (N) channels of language data, divided into packets as units, and control information designating an available language data channel or channels for the first and second video data patterns such that all of the N plural channels of language data are available for said first video data pattern and only less than N of the channels of language data are available for said second video data pattern, comprising:
   means for detecting said control information;
   means for selecting a reproducing channel of language data matched to a selected reproducing pattern of said video data based on said control information; and
   means for reproducing the language data matched to said reproducing pattern of said video data.

6. A data recording method comprising the steps of:
   receiving video data including first and second reproducing patterns and plural (N) channels of language data;
   dividing said video data and said plural channels of language data into packets as units; and
   recording said video data and said plural channels of language data on a recording medium along with control information designating an available language data channel or channels for the first and second video data patterns in which the designation by said control information is capable of enabling said first video data pattern to have associated therewith all of the N plural language data channels and is capable of enabling said second video data pattern to have associated therewith only less than N of the channels of language data.

7. A data recording apparatus comprising:
   means for receiving video data including first and second reproducing patterns and plural (N) channels of language data;
   means for dividing said video data and said plural channels of language data into packets as units; and means for recording said video data and said plural channels of language data on a recording medium along with control information designating an available language data channel or channels for the first and second video data patterns in which the designation by said control information is capable of enabling said first video data pattern to have associated therewith all of the N plural language data channels and is capable of enabling said second video data pattern to have associated therewith only less than N of the channels of language data.

8. A data recording medium having recorded thereon video data including first and second reproducing patterns and plural (N) channels of language data, divided into packets as units, and control information designating an available language data channel or channels for the first and second video data patterns in which the designation by said control information is capable of enabling said first video data pattern to have associated therewith all of the N plural language data channels and is capable of enabling said second video data pattern to have associated therewith only less than N of the channels of language data.

9. A method for reproducing data from a data recording medium having recorded thereon video data including first and second reproducing patterns and plural (N) channels of language data, divided into packets as units, and control information designating an available language data channel or channels for the first and second video data patterns in which the designation by said control information is capable of enabling said first video data pattern to have associated therewith all of the N plural language data channels and is capable of enabling said second video data pattern to have associated therewith only less than N of the channels of language data, comprising:

selecting a reproducing channel of language data matched to a selected reproducing pattern of said video data based on said control information; and reproducing the language data matched to said reproducing pattern of said video data.

10. An apparatus for reproducing data from a data recording medium having recorded thereon video data including first and second reproducing patterns and plural (N) channels of language data, divided into packets as units, and control information designating an available language data channel or channels for the first and second video data patterns in which the designation by said control information is capable of enabling said first video data pattern to have associated therewith all of the N plural language data channels and is capable of enabling said second video data pattern to have associated therewith only less than N of the channels of language data, comprising:

means for detecting said control information;

means for selecting a reproducing channel of language data matched to a selected reproducing pattern of said video data based on said control information; and means for reproducing the language data matched to said reproducing pattern of said video data.

* * * * *